United States Patent [19]
Mizuno

[11] Patent Number: 5,341,919
[45] Date of Patent: Aug. 30, 1994

[54] PIPE CONVEYOR

[76] Inventor: Katsuo Mizuno, 3-22, Shirahama-cho, Chigasaki-shi, Kanagawa-ken, Japan

[21] Appl. No.: 968,576

[22] Filed: Oct. 29, 1992

[30] Foreign Application Priority Data

Oct. 29, 1991 [JP] Japan .................... 3-283167

[51] Int. Cl.$^5$ .................................... B65G 19/14
[52] U.S. Cl. ............................. 198/716; 198/727
[58] Field of Search ............... 198/727, 716, 719, 731, 198/733, 728

[56] References Cited

U.S. PATENT DOCUMENTS

| | | | |
|---|---|---|---|
| 2,586,538 | 2/1952 | Hapman | 198/716 |
| 2,756,866 | 7/1956 | Wilde, Jr. | 198/727 X |
| 2,767,825 | 10/1956 | Welch | 198/727 X |
| 3,216,553 | 11/1965 | Leach | 198/716 X |
| 3,282,405 | 11/1966 | Larson et al. | 198/727 X |
| 3,762,535 | 10/1973 | Becker et al. | 198/727 X |
| 3,881,591 | 5/1975 | Abalo | 198/727 |
| 4,197,938 | 4/1980 | Klinkenberg | 198/716 |
| 4,890,723 | 1/1990 | Debuisson et al. | 198/716 |
| 5,062,741 | 11/1991 | Pirovano | 198/716 X |

FOREIGN PATENT DOCUMENTS

| | | | |
|---|---|---|---|
| 2644762 | 9/1990 | France | 198/727 |
| 57-83337 | 5/1982 | Japan . | |

*Primary Examiner*—D. Glenn Dayoan
*Attorney, Agent, or Firm*—Young & Thompson

[57] ABSTRACT

A pipe conveyor comprising a conveyor pipe 1, a plurality of blades 2 each having a similar sectional configuration to that of the pipe 1, and an endless link chain 3 for linking the blades 2 at suitable intervals and capable of circulating, substances delivered into the pipe 1 being conveyed by the blades 2 which are moved within the pipe 1 in accordance with the circulation of the endless link chain 3, wherein each of the blades 2 comprises an elastic blade 21 having an outer diameter generally equal to or smaller than an inner diameter of the pipe 1, and a curved disc 22 secured to a rear surface of the elastic blade 21 and adapted to support the same.

3 Claims, 3 Drawing Sheets

PIPE CONVEYOR

BACKGROUND OF THE INVENTION

1. Field of the Invention

This invention relates to a pipe conveyor capable of conveying substances to be discharged without being scattered, and more particularly to a pipe conveyor capable of so smoothly conveying substances as not to damage to the inner surface of a pipe and not to allow the substances to partly remain in the pipe.

2. Description of the Prior Art

As a conventional conveyor of this type, there is one as disclosed in, for example, Japanese Patent Publication No. Sho 61-57249. This conveyor comprises a conveyor pipe, a plurality of blades each having a similar sectional configuration to that of the pipe, and an endless link chain for linking the blades at suitable intervals. This conventional conveyor is generally used for conveying chips discharged in metal machining factories, etc. The design of this conveyor (conveyor line) can be freely changed so as to match the layout of the factories by using straight pipes, curved pipes and bent pipes.

However, this conventional conveyor has the following problems. Since each of the circular blades made of metal has a generally similar sectional configuration to that of a conveyor trough, chips (substances), while being conveyed, are jammed in or leaked from spaces formed between the circular blades and an inner surface of the pipe, which eventually makes it impossible to convey the chips smoothly.

SUMMARY OF THE INVENTION

It is therefore a general object of the present invention to provide a pipe conveyor capable of conveying substances to be discharged smoothly and surely, without allowing them to be jammed in a conveyor pipe or to partly remain within the pipe.

The present invention has achieved the above object by providing a pipe conveyor comprising a conveyor pipe, a plurality of blades each having a similar sectional configuration to that of the pipe, and an endless link chain for linking the blades at suitable intervals and capable of circulating, substances delivered into the pipe being conveyed by the blades which are moved within the pipe in accordance with the circulation of the endless link chain, wherein each of the blades comprises an elastic blade having an outer diameter generally equal to or smaller than an inner diameter of the pipe, and a support body secured to a rear surface of the elastic blade and adapted to support the same.

According to the present invention, the substances can be conveyed to a destination smoothly and surely, without allowing the substances to be jammed in the pipe and to be partly remained in the pipe while the substances are pushed and conveyed by the elastic blades moving within the pipe while contacting the inner surface of the pipe.

DETAILED DESCRIPTION OF THE EMBODIMENT

Figure 1:
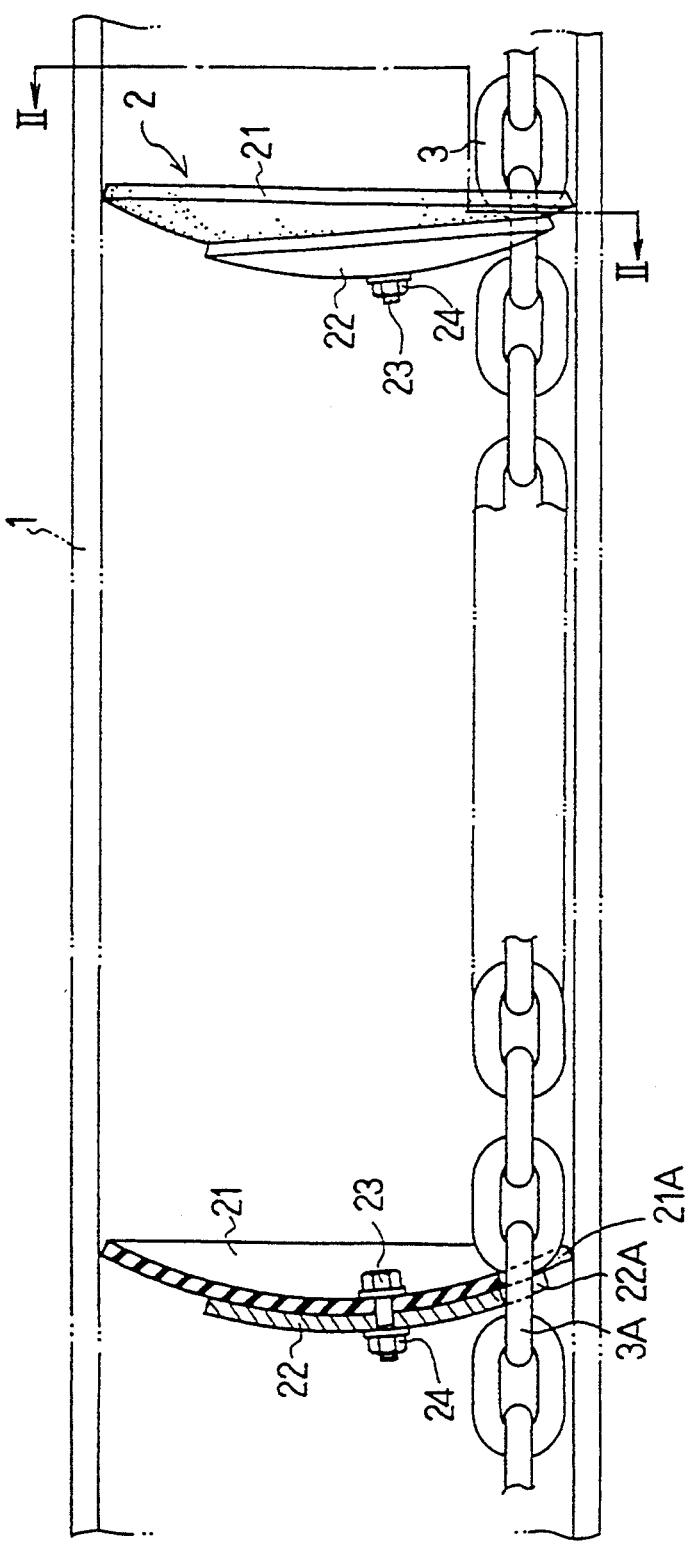
FIG. 1 is a sectional side view showing an important portion of one embodiment of a pipe conveyor according to the present invention.

One embodiment of a pipe conveyor according to the present invention will now be described with reference to FIGS. 1 through 4 inclusive.

A pipe conveyor of this embodiment, as shown in FIGS. 1 through 4, comprises a conveyor pipe 1, a plurality of blades 2 each having a similar sectional configuration to that of the pipe 1, and an endless link chain 3 for linking the blades 2 at suitable intervals and capable of circulating. Substances (not shown) delivered into the pipe are conveyed by the blades which are moved within the pipe in accordance with the circulation of the endless link chain. The pipe 1 usually comprises two parts, i.e., an outgoing passageway for conveying the substances and an incoming passageway returning to the starting point after discharging the substances. A drive source (not shown) of the endless link chain 3 includes a drive roller, a driven roller, a motor for driving the drive roller, etc., all known per se., which are engaged with the endless link chain 3 at, for example, each end of the outgoing passageway.

Each blade 2 comprises a curved elastic blade 21 having an outer diameter generally equal to an inner diameter of the pile 1, and a support body 22 for supporting the curved elastic blade 21. This support body 22, as shown in FIGS. 1 through 4, is formed of a curved disc whose curvature is that of the curved elastic blade 21. This support body 22 will be described hereinafter in the form of a curved disc 22. This curved disc 22 is secured, by a bolt 23 and a nut 24, to the back of the curved elastic blade 21 at a location slightly shifted downward of the pipe 1 from its center, with a lower end of the curved disc 22 held coincident with a lower end of the curved elastic blade 21.

Figure 2:
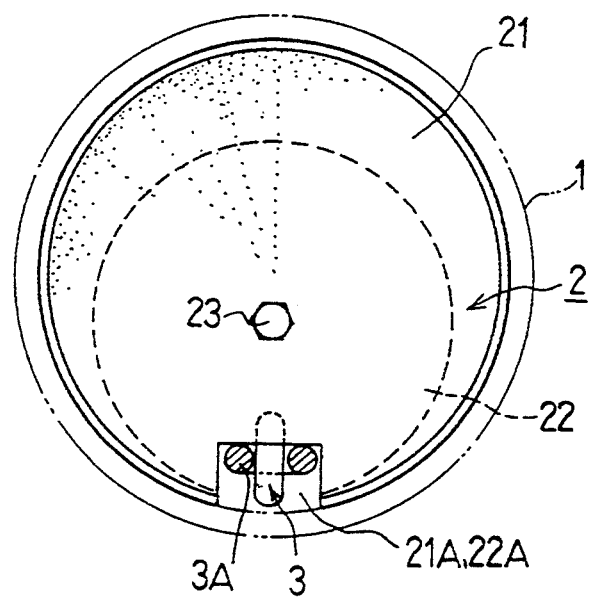
FIG. 2 is a sectional view taken on line II—II of FIG. 1.
Figure 3:
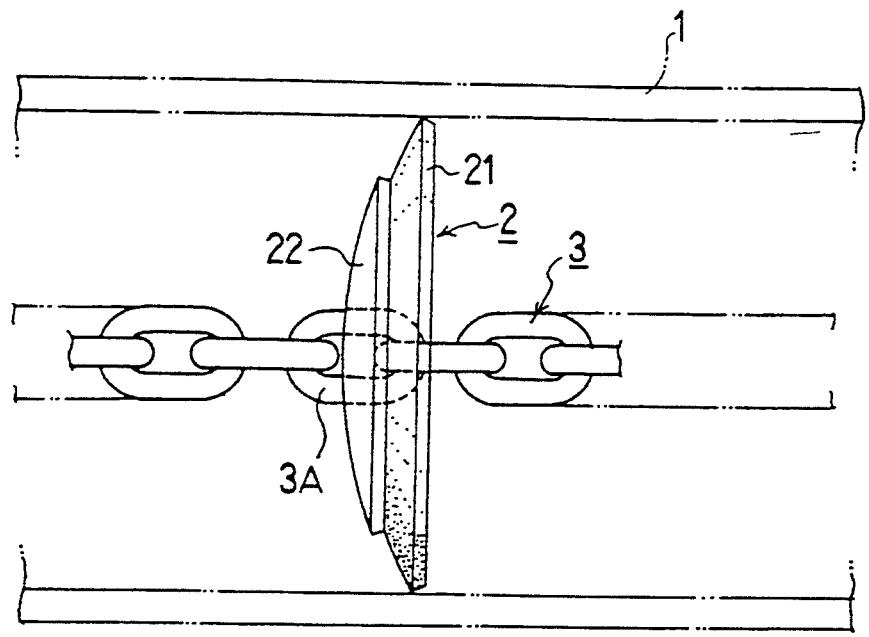
FIG. 3 is a top view of a blade of one embodiment of the pipe conveyor according to the present invention.
Figure 4:
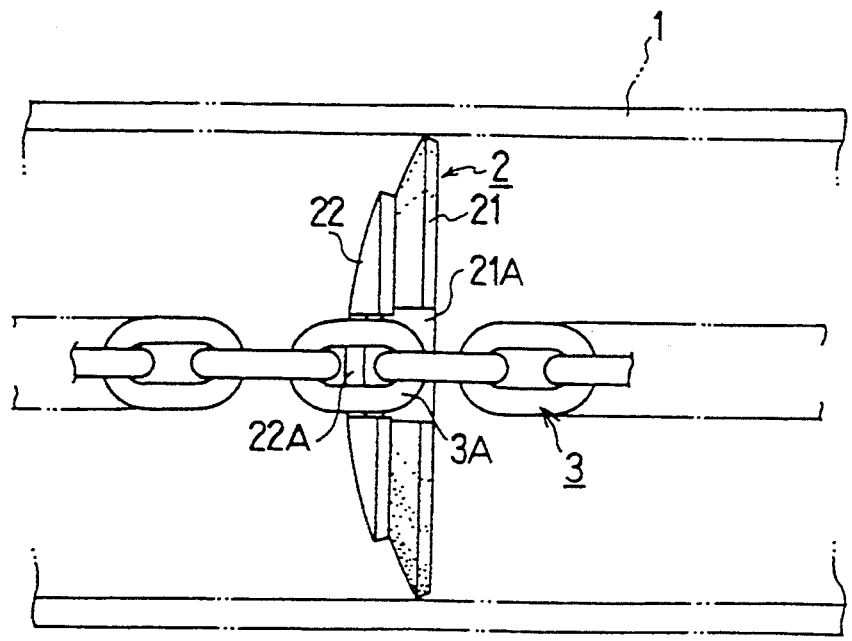
FIG. 4 is a bottom view of the blade of FIG. 3.

As shown in FIGS. 1 and 2, rectangular cutout portions 21A and 22A are formed, in an overlapped state, in the lowermost ends of the curved elastic blade 21 and curved disc 22, respectively. The curved disc 22 is fixed to a horizontal link 3A of the endless link chain 3 at the cutout portion 22A.

As for the material for forming the curved elastic blade 21, it is not particularly limited but may be selected from any suitable known elastic materials as long as they have strength enough to keep the curved state.

The diameter of the elastic blade 21 is determined depending on the type of the substances but preferably in the range of from 70 to 99% of the inner diameter of the pipe 1. The circulation direction of the endless link chain 3 may be properly changed depending on the type of the substances.

The operation of the pipe conveyor of the present invention will now be described. First, when a drive force is supplied to the endless link chain 3 from the drive source, the endless link chain 3 begins to circulate within the pipe 1. When the substances to be discharged are delivered into the pipe 1 from an inlet portion (not shown) while the endless link chain 3 is circulating within the pipe 1, the blades 2 move within the pipe 1 with the curved elastic blades 21 kept in contact with the inner surface of the pipe 1 and the substances are gradually conveyed to the destination by the blades 2.

As described above, in the pipe conveyor of this embodiment, by making the outer diameter of the blade 2 generally equal to the inner diameter of the pile 1 using a curved elastic blade 21 formed of an elastic member, no gap or space is formed between the curved elastic blade 21 and the inner surface of the pipe 1. Accordingly, the substances can be conveyed to the destination smoothly and surely without allowing the substances, whether large or small, to be jammed between the curved elastic blade 21 and the pipe 1 and to partly remain in the pipe 1, particularly in a successive conveyor space defined by two curved elastic blades 21 within the pipe 1, during the conveyance of the substances by the blade 2. Since the blade 2 moves within the pipe 1 with the curved elastic blade 21 kept in contact with the inner surface of the pipe 1, the attitude of the blade 1 is stable, which also makes it possible to convey the substances in a stable manner.

The pipe conveyor of the present invention is, by no means, limited to the above embodiment. Particularly, the ways of fixture between the curved elastic disc 22 and the endless link chain 3 can be suitably changed in accordance with necessity. It is good enough for the present invention, if the pipe conveyor comprises a plurality of blades each including a curved elastic blade having an outer diameter generally equal to or smaller than the inner diameter of the pipe, and a support body secured to a rear surface of the curved elastic blade for supporting the same.

The substances to be conveyed by the pipe conveyor of the present invention may be, in addition to exhausts produced in factories, those which can be conveyed within the conveyor pipe, and therefore, they are not particularly limited.

The pipe conveyor according to the present invention is capable of conveying the substances smoothly and surely, without allowing them to be jammed in a conveyor pipe or to partly remain within the pipe.

What is claimed is:

1. A pipe conveyor comprising a conveyor pipe, a plurality of blades each having a similar sectional configuration to that of said pipe, and an endless link chain for linking said blades at suitable intervals and capable of circulating, substances delivered into said pipe being conveyed by said blades which are moved within said pipe in accordance with the circulation of said endless link chain, each of said blades comprising an elastic blade having an outer diameter no greater than an inner diameter of said pipe, and a support body secured to a rear surface of said elastic blade and adapted to support the same, wherein the elastic blade is concave and the support body is concave and of the same curvature as the elastic blade.

2. A pipe conveyor as claimed in claim 1, wherein said elastic blade and said support body are part spherical.

3. A pipe conveyor comprising a conveyor pipe, a plurality of blades each having a similar sectional configuration to that of said pipe, and an endless link chain for linking said blades at suitable intervals and capable of circulating, substances delivered into said pipe being conveyed by said blades which are moved within said pipe in accordance with the circulation of said endless link chain, each of said blades comprising an elastic blade having an outer diameter no greater than an inner diameter of said pipe, and a support body secured to a rear surface of said elastic blade and adapted to support the same, wherein both said endless link chain and said support body are offset toward one edge of said elastic blade, and said one edge of said elastic blade coincides with an edge of said support body at said one edge of said elastic blade.

* * * * *